United States Patent [19]

Mazon-Ramos et al.

[11] Patent Number: 5,372,977
[45] Date of Patent: Dec. 13, 1994

[54] GLASS COMPOSITION FOR THE MANUFACTURE OF GLAZINGS

[75] Inventors: Pedro Mazon-Ramos, Oviedo; Pedro Alvarez-Casariego, Salinas, both of Spain

[73] Assignee: Saint-Gobain Vitrage International, Courbevoie, France

[21] Appl. No.: 171,158

[22] Filed: Dec. 22, 1993

[30] Foreign Application Priority Data

Dec. 23, 1992 [FR] France ................. 92 15538

[51] Int. Cl.⁵ .............. C03C 3/087; C03C 3/23
[52] U.S. Cl. ........................ 501/57; 501/70
[58] Field of Search ......................... 501/57, 70

[56] References Cited

U.S. PATENT DOCUMENTS

| | | |
|---|---|---|
| 2,893,882 | 7/1959 | Swift et al. |
| 3,652,303 | 3/1972 | Rao. |
| 3,779,733 | 12/1973 | Janakirama-Rao .............. 65/32 |
| 4,792,536 | 12/1988 | Pecoraro et al. ................ 501/70 |
| 4,906,597 | 3/1990 | Speit ................................ 501/60 |
| 4,980,319 | 12/1990 | Speit ................................ 501/60 |
| 5,077,133 | 12/1991 | Cheng ......................... 501/70 X |
| 5,214,008 | 5/1993 | Beckwith et al. ............ 501/70 X |
| 5,240,886 | 8/1993 | Gulotta et al. ................. 501/70 |

FOREIGN PATENT DOCUMENTS

| | | |
|---|---|---|
| 0297404 | 1/1989 | European Pat. Off. . |
| 2672587 | 8/1992 | France . |
| 3643421A1 | 6/1988 | Germany . |

Primary Examiner—Karl Group
Attorney, Agent, or Firm—Oblon, Spivak, McClelland, Maier & Neustadt

[57] ABSTRACT

Soda-lime-silica glass containing iron and fluorine has a high total light transmission factor while absorbing infrared radiation. This glass is useful in making glazings for automotive uses.

11 Claims, 1 Drawing Sheet

GLASS COMPOSITION FOR THE MANUFACTURE OF GLAZINGS

BACKGROUND OF THE INVENTION

1. Field of the Invention

The present invention relates to compositions for soda-lime-silica glass suitable for the production of glazings which can be used in motor vehicles. These glass compositions contain between about 0.3 and 1% by weight total iron expressed in the form $Fe_2O_3$, at least 35% of said iron being in the form FeO, and about 0.5 to 2.8 wt % fluorine. This glass composition is used to make a glazing having at least one glass sheet with a total light transmission factor under illuminant A of at least 70% for a thickness between 0.8 and 6 mm.

2. Discussion of the Background

Glazings used for automotive applications must satisfy legal requirements with respect to their light transmission. Thus, a glazing used as a windshield must, in certain countries, have a total light transmission factor under illuminant A ($TL_A$ as defined by the International Commission on Illumination) of at least 75%. The glazings used for the production of side and rear windows must, under the same conditions, have a factor $TL_A$ of at least 70%.

As the amount of glass used in motor vehicles is at present very large and customers are making ever greater demands regarding comfort, all vehicle designers are seeking ways of making it possible to reduce the amount of heat felt by passengers. One of these ways is to use glazings with a total energy transmission factor ($T_E$) which is as low as possible.

In order to maintain a high light transmission in the visible part of the spectrum, while absorbing to the greatest possible extent the remainder of the solar energy, it is known to introduce iron into a glass composition. The iron is present in the glass both as ferric oxide ($Fe_2O_3$) and ferrous oxide (FeO).

The presence of $Fe_2O_3$ makes it possible to absorb UV radiation and radiation having short wavelengths in the visible part of the spectrum. The presence of FeO makes it possible to absorb near IR radiation and radiation corresponding to the long wavelengths of the visible range. Although an increase in the content of iron in these two oxide forms improves the absorption of radiation at the two ends of the visible spectrum, this effect is obtained to the detriment of the light transmission.

Hitherto a number of solutions have been proposed for the optimum utilization of the capacity of iron oxides to absorb radiation, while still maintaining the greatest possible light transmission.

Solutions favoring the absorption of radiation in the near IR range are described in U.S. Pat. Nos. 3,652,303 and 4,792,536. The glasses described in these patents are produced under conditions such that the FeO proportion compared with the total iron is very high, being at least equal to 80% in the first patent and at least 35% in the second patent.

The iron content of the glasses described in U.S. Pat. No. 3,652,303 can vary widely (0.1 to 2% by weight). The transmission curves in this patent show that the "blue glass" according to the invention has a higher adsorption in the IR range than the two glasses given as references. It should be noted that the absorption band of the blue glass extends much more into the visible range than that of the glass called "green tinted plate".

In U.S. Pat. No. 4,792,536, the iron content varies within much narrower limits (0.45 to 0.65%). It can also be observed that the absorption band of glass No. 5, which illustrates this invention, extends further into the visible range than that of glass No. 3 illustrating the prior art.

A need continues to exist for glass compositions used to make glazings having a high total transmission factor while absorbing substantial IR radiation.

SUMMARY OF THE INVENTION

Accordingly, one object of the present invention is a glass composition which absorbs infrared radiation (IR), while retaining and even increasing the light transmission factor.

A further object is a glass composition, where absorption in the infrared, due to the presence of FeO, is accompanied by a much smaller absorption in the visible range than that observed in known glasses having an identical FeO content.

These objects have been achieved by the soda-lime-silica glass composition of the invention which comprises between about 0.3 and 1% by weight iron in the form $Fe_2O_3$, at least 35% of this iron being in the form FeO, and about 0.5 to 2.8% by weight fluorine.

DETAILED DESCRIPTION OF THE PREFERRED EMBODIMENTS

Figure 1:
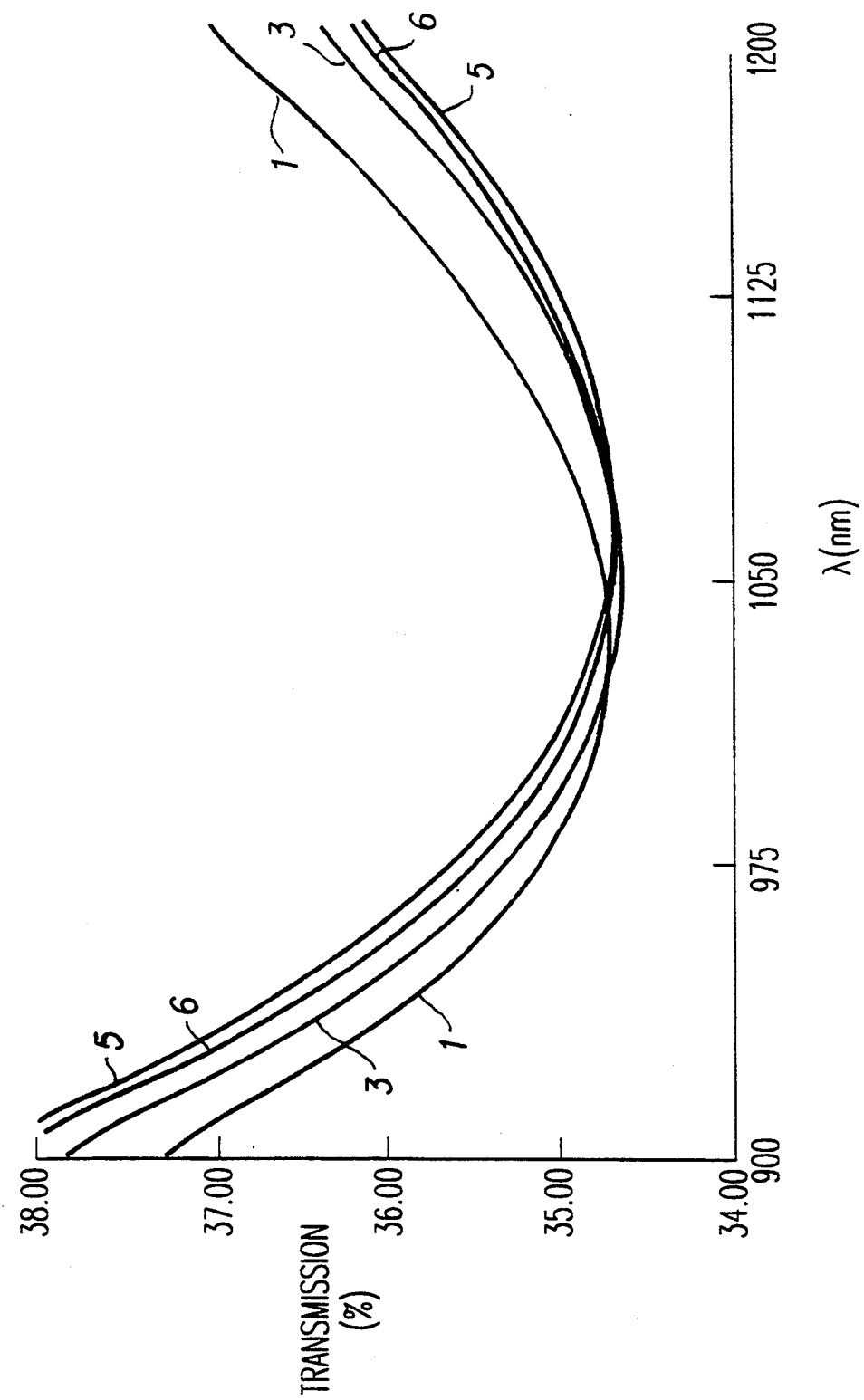
FIG. 1 shows the transmission spectra of four glasses containing differing amounts of fluorine.

The present invention is based on the discovery that the presence of fluorine in defined proportions in a soda-lime-silica glass containing ferrous oxide has an influence on the $TL_A$ and $T_E$ factors of the glass. Thus, it has been discovered that fluorine has the effect of displacing the maximum of the absorption band due to FeO in the near IR towards greater wavelengths. It has also been discovered that fluorine has the effect of straightening the absorption band gradient at the end of the near visible IR range. Compared with a fluorine-free soda-lime-silica glass containing a given FeO quantity, this double effect makes it possible to either increase the $TL_A$ factor while retaining the same FeO content, or makes it possible to increase the $TL_A$ factor so as to reduce the $T_E$ factor, while maintaining the $TL_A$ factor at its initial value.

As a function of the thickness of the desired glazing and the desired absorption in the IR range, all possible combinations can take place between the maximum increase in the $TL_A$ factor and the maximum decrease in the $T_E$ factor. Finally, it has been discovered that this double effect does not increase with an increase in the fluorine proportion in the glass. The total iron content for a given oxidoreduction level, determines the FeO content.

Thus, for low or moderate total iron contents between about 0.3 and 0.6% by weight, the effective fluorine content is between about 0.5 and 1.5% by weight. A higher fluorine content does not lead to a supplementary displacement of the absorption band maxima towards high wavelengths and/or a greater straightening of the gradient of the absorption band.

In the case of glasses with a moderate or higher total iron content between about 0.5 and 1% by weight, the effective fluorine content is generally between about 1 and 2.5% by weight.

The soda-lime-silica glasses which can be used in the present invention may contain the following constituents, in weight proportions defined by the following limits:

|  |  |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5%, | the sum of the alkaline earth oxides being between about 6 and 16 wt % and that of the alkali metal oxides between about 10 and 20 wt %.

The examples of glasses appearing in the following tables I, II and III clearly illustrate the invention but are not intended to be limiting thereof. In these tables the values of the transmission factors have been calculated relative to an identical total light transmission factor equal to 76% (table I) or 71% (tables II and III).

The compositions of these glasses incorporates the constituents shown below, in approximate weight proportions:

|  |  |
|---|---|
| $SiO_2$ | 70% |
| $Al_2O_3$ | 1% |
| CaO | 9% |
| MgO | 4% |
| $Na_2O$ | 14% |
| $K_2O$ | 0.2% |
| $SO_3$ | 0.2% |

The composition of the glasses of examples 7 and 8 appearing in table II give a measure of the fluctuations around this mean composition. These glasses can also incorporate a very small quantity of constituents supplied by impurities of vitrifiable starting materials, such as $TiO_2$, or as a result of the introduction of cullet into the vitrifiable mixture. The fluctuations around the aforementioned composition are a function of the total content of the constituents introduced into these glasses for modifying their transmission factors.

The glasses of examples 1 to 6 illustrate the influence of fluorine concentration on the total energy transmission factor. These glasses contain approximately the same total iron quantity, expressed as $Fe_2O_3$, and roughly the same FeO quantity, which remains between 0.20 and 0.23% by weight.

The glass of example 1 is a fluorine-free reference glass. The glass of example 2 is an intermediate glass, while the glasses of examples 3 to 6 illustrate the invention.

FIG. 1 shows part of the transmission curves between 900 and 1200 nm of four of these glasses. The reference figures on these curves correspond to the glasses of examples 1, 3, 5 and 6.

Curves 1, 3 and 5, which correspond to glasses containing respectively 0.0, 0.66 and 1.14 wt. % fluorine, show a displacement of the absorption maximum of approximately 15 nm between the glasses of examples 1 and 3 and a further displacement of 15 nm between the glasses of examples 3 and 5.

Even more surprising is the straightening of the slope of the absorption band between 900 nm and the band maximum. It must also be noted that there is greater absorption of the glasses of examples 3 and 5 between the absorption band maximum and 1200 nm.

The fluorine content of the glass of example 6 is more than twice that of the glass of example 5. However, surprisingly and compared with curve 5, curve 6 shows that absorption beyond the maximum of the band is slightly lower and that the straightening of the band below the maximum is less pronounced.

This phenomenon again appears in the evolution of the transmission factors, those of the glasses of examples 1 to 6 having been measured for a thickness of 4.2 mm. For a constant total light transmission factor, there is a progressive reduction of the $T_E$ factor, the glass of example 6 having a $T_E$ factor identical to the glass of example 3, while the latter has a four times lower fluorine content.

The knowledge of such an influence according to the invention is particularly vital, because it allows one to obtain the maximum effect using the minimum quantity of a constituent, whose use can cause atmospheric pollution problems and which can lead to faults in the glass.

The influence of fluorine on the $T_E$ factor of a glass containing a relatively high iron percentage is illustrated in table II by the glass of example 8, compared with the glass of example 7 serving as a reference.

The absorption of ultraviolet rays by the glasses according to the invention can be significantly increased by introducing cerium trioxide into the composition. This increase in the absorption in the ultraviolet range is obtained without reducing the influence of fluorine described above. The glasses of table III clearly illustrate this double effect.

The glasses of examples 10 to 12, compared with the glass of example 9, show the considerable influence of cerium trioxide, even when the latter is introduced in a relatively small quantity. The glass of example 13 compared with the glass of example 11 again illustrates the influence of fluorine on the $T_E$ factor.

The glasses according to the invention may contain up to 1.6 wt. % of $Ce_2O_3$. However, for cost reasons, the $Ce_2O_3$ content is preferable between about 0.3 and 0.8 wt. %.

The glasses according to the invention are compatible with conventional flat glass manufacturing methods, provided that, for certain glasses, they are produced in furnaces equipped with electrodes. The thickness of the glass sheet obtained, e.g. by spreading molten glass onto a tin bath, can vary between about 0.8 and 10 mm. The sheet obtained by cutting the glass sheet can subsequently undergo a bending operation, particularly when it is to be used for a motor vehicle.

In order to produce windshields or side windows, the initial sheet is cut to the desired size and has a thickness which generally varies between about 0.8 and 6 mm. For example, a windshield can be produced by combining two glass sheets according to the invention, each having a thickness of 2.1 mm and combined with a spacing polyvinylbutyral sheet. With these thicknesses, the glasses according to the invention have a total light transmission factor under illuminant A of at least 70%, while ensuring good thermal comfort.

Like other glazings, the glazings obtained from the glasses according to the invention can undergo prior surface treatments or can be combined with an organic coating, such as a film based on polyurethanes having antilacerating properties, or a film ensuring sealing in the case of breaking. It can also be locally coated with a coating such as an enamel coating. The glazings according to the invention can further be coated with at least one metal layer constituted, for example, by a metal oxide and obtained by high temperature chemical deposition, such as pyrolysis or chemical vapor deposition, or by vacuum deposition.

Obviously, numerous modifications and variations of the present invention are possible in light of the above teachings. It is therefore to be understood that within the scope of the appended claims, the invention may be practiced otherwise than as specifically described herein.

TABLE I

Properties measured for a thickness of 4.2 mm

|  | Ex. 1 | Ex. 2 | Ex. 3 | Ex. 4 | Ex. 5 | Ex. 6 |
|---|---|---|---|---|---|---|
| $Fe_2O_3$ (total iron, wt. %) | 0.43 | 0.44 | 0.45 | 0.43 | 0.42 | 0.41 |
| Redox | 0.49 | 0.45 | 0.45 | 0.53 | 0.53 | 0.49 |
| F (wt. %) | — | 0.29 | 0.66 | 0.92 | 1.14 | 2.67 |
| $TL_A$ (%) | 76 | 76 | 76 | 76 | 76 | 76 |
| $T_F$ (%) | 49.0 | 48.7 | 48.0 | 47.4 | 47.0 | 48.0 |
| $T_{UV}$ (%) | 40.7 | 37.7 | 39.4 | 42.0 | 42.4 | 39.8 |
| $\lambda_D$ (nm) | 490 | 490 | 490 | 490 | 491 | 491 |
| $P_C$ (%) | 6.5 | 5.9 | 6.1 | 6.4 | 5.9 | 5.6 |

$TL_A$ = total light transmission factor under illuminant A
$T_E$ = total energy transmission factor
$T_{UV}$ = total UV light transmission
$\lambda_D$ = dominant wavelength under illuminant C
$P_C$ = colorimetric purity under illuminant C

TABLE II

Properties measured for a thickness of 3.85 mm

|  | Ex. 7 | Ex. 8 |
|---|---|---|
| $SiO_2$ (wt. %) | 70.3 | 69.0 |
| $Al_2O_3$ (wt. %) | 0.71 | 0.71 |
| CaO (wt. %) | 9.09 | 10.0 |
| MgO (wt. %) | 4.63 | 3.95 |
| $Na_2O$ (wt. %) | 14.1 | 13.8 |
| $K_2O$ (wt. %) | 0.09 | 0.05 |
| $Fe_2O_3$ (total iron) (wt. %) | 0.78 | 0.70 |
| Redox | 0.33 | 0.49 |
| F (wt. %) | — | 1.70 |
| $SO_3$ (wt. %) | 0.26 | 0.10 |
| $TL_A$ (wt. %) | 71 | 71 |
| $T_F$ (%) | 42.5 | 39.8 |
| $T_{UV}$ (%) | 23.0 | 35.4 |
| $\lambda_D$ (nm) | 494 | 490 |
| $P_C$ (%) | 5 | 8 |

TABLE III

Properties measured for a thickness of 3.85 mm

|  | Ex. 9 | Ex. 10 | Ex. 11 | Ex. 12 | Ex. 13 |
|---|---|---|---|---|---|
| $Fe_2O_3$ (total iron, wt. %) | 0.64 | 0.60 | 0.63 | 0.66 | 0.62 |
| Redox | 0.53 | 0.58 | 0.52 | 0.49 | 0.48 |
| F (wt. %) | 1.37 | 1.60 | 1.18 | 1.34 | — |
| $Ce_2O_3$ (wt. %) | — | 0.44 | 0.68 | 1.48 | 0.65 |
| $TL_A$ (%) | 71 | 71 | 71 | 71 | 71 |
| $T_F$ (%) | 40.2 | 40 | 40.5 | 40.5 | 42.1 |
| $T_{UV}$ (%) | 36.1 | 24.5 | 20.9 | 15.8 | 17.6 |
| $\lambda_D$ (nm) | 490 | 491 | 490 | 491 | 491 |
| $P_C$ (%) | 8.6 | 7.1 | 7.9 | 7.3 | 7.5 |

What is claimed as new and desired to be secured by Letters Patent of the United States is:

1. A soda-lime-silica glass composition comprising about 0.3–1.0 wt. % total iron, expressed as $Fe_2O_3$, at least 35% of said iron being in the FeO form, and about 0.5–2.8 wt. % fluorine.

2. The glass composition of claim 1, wherein the total iron content is about 0.3–0.6 wt. %, and the fluorine content is about 0.5–1.5 wt. %.

3. The glass composition of claim 1, wherein the total iron content is about 0.5–1.0 wt. %, and the fluorine content is about 1.0–2.5 wt. %.

4. The glass composition of claim 2, further comprising $Ce_2O_3$ in an amount up to 1.6 wt. %.

5. The glass composition of claim 3, further comprising $Ce_2O_3$ in an amount up to 1.6 wt. %.

6. The glass composition of claim 4, comprising 0.3–0.8 wt. % $Ce_2O_3$.

7. The glass composition of claim 5, comprising 0.3–0.8 wt. % $Ce_2O_3$.

8. A glass sheet made from the glass composition of claim 1.

9. The glass sheet of claim 8 having a thickness of about 0.8–10 mm.

10. The glass sheet of claim 8, wherein said glass sheet has a total light transmission factor under illuminant A of at least 70% and a thickness between about 0.8–6 mm.

11. A glazing containing multiple glass sheets wherein at least one of said glass sheets is the glass sheet of claim 8.

* * * * *